(12) United States Patent
Leung et al.

(10) Patent No.: US 9,391,493 B2
(45) Date of Patent: Jul. 12, 2016

(54) AIR COOLED ELECTRIC MOTOR

(71) Applicant: Regal Beloit America, Inc., Beloit, WI (US)

(72) Inventors: Ngan Fai Leung, Vandalia, OH (US); Stephen Thomas English, Englewood, OH (US); Matthew William Critchley, Milwaukee, WI (US); Janice Fitzgerald, Mequon, WI (US); Frank Edward Staigl, III, Greenville, OH (US); Joseph Henry, Vandalia, OH (US); Barbara Mary Shanks, Vandalia, OH (US); John R. Belko, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 364 days.

(21) Appl. No.: 13/974,799

(22) Filed: Aug. 23, 2013

(65) Prior Publication Data
US 2013/0342051 A1    Dec. 26, 2013

Related U.S. Application Data

(63) Continuation of application No. 12/893,533, filed on Sep. 29, 2010, now Pat. No. 8,519,582.

(60) Provisional application No. 61/246,875, filed on Sep. 29, 2009.

(51) Int. Cl.
*H02K 9/00* (2006.01)
*H02K 9/06* (2006.01)
*H02K 9/14* (2006.01)

(52) U.S. Cl.
CPC .. *H02K 9/06* (2013.01); *H02K 9/14* (2013.01); *H02K 11/33* (2016.01)

(58) Field of Classification Search
CPC ........... H02K 9/06; H02K 15/10; H02K 9/22; H02K 15/14
USPC ..................... 310/43, 45, 62, 59, 89, 406–407
See application file for complete search history.

(56) References Cited

U.S. PATENT DOCUMENTS 1,782,458 A    11/1930   Brennen
1,996,460 A    4/1935    Coates
(Continued)

FOREIGN PATENT DOCUMENTS

EP       0581966      2/1994
GB       911769       11/1962
(Continued)

OTHER PUBLICATIONS

International Search Report and Written Opinion for Application No. PCT/US2010/050706 dated May 27, 2011 (18 pages).
(Continued)

*Primary Examiner* — Thanh Lam
(74) *Attorney, Agent, or Firm* — Michael Best & Friedrich LLP (57) ABSTRACT

An electric machine includes a stator having a first end and a second end and an end frame including a first cup portion arranged to at least partially contain a portion of the stator. The end frame is positioned adjacent the first end of the stator. A potting cup includes a second cup portion arranged to at least partially contain a portion of the stator. The potting cup is positioned adjacent the second end of the stator. A potting member is coupled to the stator, the end frame, and the potting cup to permanently bond the end frame, the potting cup, and the stator to one another.

18 Claims, 9 Drawing Sheets

(56) References Cited

U.S. PATENT DOCUMENTS

| | | | | |
|---|---|---|---|---|
| 2,117,915 | A | 5/1938 | Shutt | |
| 2,338,515 | A | 1/1944 | Johns | |
| 2,778,958 | A | 1/1957 | Hamm et al. | |
| 2,876,370 | A * | 3/1959 | Pleuger | H02K 5/132 310/271 |
| 2,944,297 | A | 7/1960 | Maynard | |
| 3,075,250 | A | 1/1963 | Strohm et al. | |
| 3,084,418 | A | 4/1963 | Procopio | |
| 3,127,531 | A | 3/1964 | Tothero | |
| 3,201,729 | A | 8/1965 | Serge et al. | |
| 3,250,926 | A | 5/1966 | O'Reilly et al. | |
| 3,256,590 | A | 6/1966 | Myers | |
| 3,436,569 | A | 4/1969 | Flaherty et al. | |
| 3,643,119 | A | 2/1972 | Lukens | |
| 3,675,056 | A | 7/1972 | Lenz | |
| 3,688,137 | A * | 8/1972 | Filhol | H01B 3/002 310/43 |
| 3,801,843 | A | 4/1974 | Corman et al. | |
| 3,906,267 | A | 9/1975 | Coupin et al. | |
| 4,028,570 | A | 6/1977 | Kieffer et al. | |
| 4,128,527 | A | 12/1978 | Kinjo et al. | |
| 4,406,959 | A | 9/1983 | Harano et al. | |
| 4,465,948 | A | 8/1984 | Oyama et al. | |
| 4,560,893 | A | 12/1985 | Van De Griend | |
| 4,742,257 | A | 5/1988 | Carpenter | |
| 4,839,547 | A | 6/1989 | Lordo et al. | |
| 4,843,269 | A | 6/1989 | Shramo | |
| 4,908,538 | A | 3/1990 | Geberth, Jr. | |
| 4,922,604 | A | 5/1990 | Marshall et al. | |
| 4,931,678 | A | 6/1990 | Lutz | |
| 4,933,581 | A | 6/1990 | Shramo | |
| 4,950,133 | A | 8/1990 | Sargent | |
| 5,008,572 | A | 4/1991 | Marshall et al. | |
| 5,073,736 | A | 12/1991 | Gschwender et al. | |
| 5,173,629 | A | 12/1992 | Peters | |
| 5,212,419 | A | 5/1993 | Fisher et al. | |
| 5,233,248 | A * | 8/1993 | Kawamura | H02K 1/185 310/156.25 |
| 5,311,090 | A | 5/1994 | Ferlatte | |
| 5,350,281 | A | 9/1994 | Hagshenas | |
| 5,394,043 | A | 2/1995 | Hsia | |
| 5,525,850 | A | 6/1996 | Stinson | |
| 5,559,380 | A | 9/1996 | Nakamura et al. | |
| 5,657,723 | A | 8/1997 | Edelmann et al. | |
| 5,904,471 | A | 5/1999 | Woollenweber et al. | |
| 5,959,384 | A | 9/1999 | Mosciatti et al. | |
| 5,982,071 | A | 11/1999 | Ehrick | |
| 6,011,331 | A | 1/2000 | Gierer et al. | |
| 6,037,684 | A | 3/2000 | Deyoung et al. | |
| 6,093,990 | A | 7/2000 | Meeks et al. | |
| 6,172,436 | B1 | 1/2001 | Subler et al. | |
| 6,177,744 | B1 | 1/2001 | Subler et al. | |
| 6,183,208 | B1 | 2/2001 | Quandil et al. | |
| 6,239,521 | B1 | 5/2001 | Lee | |
| 6,294,852 | B1 | 9/2001 | Lee | |
| 6,313,556 | B1 | 11/2001 | Dombrovski et al. | |
| 6,359,353 | B1 | 3/2002 | Bevington | |
| 6,413,061 | B1 | 7/2002 | Esumi et al. | |
| 6,435,836 | B1 | 8/2002 | Kobayashi et al. | |
| 6,488,475 | B2 | 12/2002 | Murata et al. | |
| 6,563,240 | B2 | 5/2003 | Lin et al. | |
| 6,570,276 | B1 | 5/2003 | Morel et al. | |
| 6,680,550 | B2 | 1/2004 | Matsunaga et al. | |
| 6,734,584 | B1 | 5/2004 | Browne et al. | |
| 6,798,092 | B1 | 9/2004 | Gabrys et al. | |
| 6,798,096 | B2 | 9/2004 | Browne et al. | |
| 6,882,070 | B2 | 4/2005 | Staigl, III et al. | |
| 6,933,638 | B2 | 8/2005 | Hirth | |
| 6,933,640 | B2 | 8/2005 | Schurter et al. | |
| 7,025,576 | B2 | 4/2006 | Chaffee | |
| 7,073,248 | B2 | 7/2006 | Hackett | |
| 7,205,687 | B2 | 4/2007 | Wavre et al. | |
| 7,394,175 | B2 | 7/2008 | McAuliffe et al. | |
| 7,541,701 | B2 | 6/2009 | Lin et al. | |
| 7,675,209 | B2 * | 3/2010 | Masoudipour | H02K 5/20 310/57 |
| 2002/0047480 | A1 * | 4/2002 | Heim | H02K 3/50 310/260 |
| 2002/0089242 | A1 * | 7/2002 | Liang | H02K 9/22 310/45 |
| 2005/0074548 | A1 | 4/2005 | Puterbaugh et al. | |
| 2006/0061221 | A1 | 3/2006 | Mcauliffe et al. | |
| 2007/0152523 | A1 | 7/2007 | Bookout | |
| 2007/0273220 | A1 | 11/2007 | Koyama et al. | |
| 2007/0284954 | A1 | 12/2007 | Lin et al. | |
| 2008/0036314 | A1 | 2/2008 | Kanei et al. | |
| 2008/0284954 | A1 | 11/2008 | Kamijo et al. | |
| 2009/0146513 | A1 | 6/2009 | Brumner | |
| 2009/0152962 | A1 | 6/2009 | Gasser et al. | |
| 2009/0167101 | A1 | 7/2009 | Saga et al. | |
| 2009/0195108 | A1 | 8/2009 | Rippel et al. | |
| 2009/0230791 | A1 | 9/2009 | Scharfenberg et al. | |
| 2011/0227428 | A1 * | 9/2011 | Vedy | H02K 1/185 310/43 |

FOREIGN PATENT DOCUMENTS

| | | |
|---|---|---|
| GB | 1450501 | 9/1976 |
| GB | 2220800 | 1/1990 |
| JP | 59169349 | 9/1984 |
| JP | 2002218704 | 8/2002 |
| JP | 2003023754 | 1/2003 |
| JP | 2004357373 | 12/2004 |
| JP | 2009081994 | 4/2009 |
| WO | 96/31936 | 10/1996 |
| WO | 02/060039 | 8/2002 |
| WO | 03/021741 | 3/2003 |
| WO | 2005/041390 | 5/2005 |
| WO | 2006/013134 | 2/2006 |
| WO | 2008/022108 | 2/2008 |
| WO | 2009/029743 | 3/2009 |
| WO | 2011/041403 | 4/2011 |

OTHER PUBLICATIONS

Invitation to Pay Additional Fees and Partial International Search for Application No. PCT/US2010/050706 dated Mar. 30, 2011 (5 pages).

PCT/US2010/050706 International Preliminary Report on Patentability, Search Report and Written Opinion dated Apr. 12, 2012 (14 pages).

Office Action from the United States Patent and Trademark Office for U.S. Appl. No. 12/893,533 dated Nov. 26, 2012 (5 pages).

* cited by examiner

AIR COOLED ELECTRIC MOTOR

RELATED APPLICATIONS

This application is a continuation of U.S. patent application Ser. No. 12/893,533, filed Sep. 29, 2010, now U.S. Pat. No. 8,519,582, which claims priority to U.S. Provisional Patent Application No. 61/246,875, filed Sep. 29, 2009, the entire contents of which are incorporated herein by reference.

BACKGROUND

The invention relates to air-cooled electric motors. More specifically, the invention relates to improved cooling and corrosion resistance in air-cooled electric pump motors.

Generally, motors used in pumps and similar applications include steel, or other metal, covers and mainframes that tend to rust or deteriorate. The significance of the problem increases in humid environments where moisture causes rust build-up. Rust can develop or corrosion can occur in bearings, mainframes, stators, windings and shafts; all of which can lead to premature motor failure. Bearing failure, also caused by pump seal failures, causes grease removal and dirt intrusion. Chlorine can cause damage to critical components of motors by promoting corrosion.

Furthermore, temperature control in motors is commonly a problem due to the fact that discharge air that has already increased in temperature across the motor re-circulates. The air removes heat from the motor and is typically controlled to keep it flowing across the hottest components. If the air has already been heated, it cannot effectively continue to perform the task.

SUMMARY

In one construction, the invention provides an electric machine that includes a stator having a first end and a second end and an end frame including a first cup portion arranged to at least partially contain a portion of the stator. The end frame is positioned adjacent the first end of the stator. A potting cup includes a second cup portion arranged to at least partially contain a portion of the stator. The potting cup is positioned adjacent the second end of the stator. A potting member is coupled to the stator, the end frame, and the potting cup to permanently bond the end frame, the potting cup, and the stator to one another.

In another construction, the provides an electric machine including a stator having a core portion, a first end winding portion, and a second end winding portion, the stator defining an outer perimeter that defines a stator volume. An end frame includes a first cup portion positioned adjacent the first end winding portion and arranged to at least partially surround the first end winding portion. A potting cup includes a second cup portion positioned adjacent the second end winding portion and arranged to at least partially surround the second end winding portion. A potting member is coupled to the stator, the end frame, and the potting cup to permanently bond the end frame, the potting cup, and the stator to one another, the potting member cooperating with the stator to completely fill the stator volume.

In still another construction, the invention provides a method of assembling an electric machine that includes placing a plurality of windings within a stator core. The windings extend out a first end to define a first end winding portion and extend out a second end to define a second end winding portion. The stator core, windings, first end winding portion, and second end winding portion cooperating to define a stator having a stator volume. The method also includes positioning an end frame adjacent the first end winding portion, the end frame including a first cup portion that surrounds an outermost portion of the first end winding portion and an axial end of the first end winding portion. The method further includes positioning a potting cup adjacent the second end winding portion, the potting cup including a second cup portion that surrounds an outermost portion of the second end winding portion and an axial end of the second end winding portion. The method also includes injecting a liquid potting compound into the stator volume and solidifying the potting compound to define a potting member that permanently bonds the end frame and the potting cup to the stator.

In one embodiment, the invention provides an electric motor assembly. A stator includes a set of windings and has a first end, a second end, and an outer radial surface. A rotor includes a shaft having an axis. A first frame supports the shaft at a first axial position. A canopy substantially surrounds the first frame. The canopy includes a fluid inlet and a fluid discharge. A second frame supports the shaft at a second axial position and includes at least one fluid outlet. A chute is positioned downstream of the canopy fluid discharge. The chute directs fluid flow along the outer radial surface of the stator towards the fluid outlet. A fan is coupled to the shaft for rotation with the shaft.

In another embodiment, the invention provides a method of air-cooling an electric motor assembly that substantially reduces recirculation of the air. The method includes drawing air into an air inlet disposed about a first frame. The air inlet includes an inner wall and an outer wall. A flange disposed downstream of the air inlet directs the air radially inward and across an external surface of a stator cup disposed between the first frame and a stator. A chute confines the air radially outward of an external surface of the stator. The air is drawn into a fan compartment of a second frame through a fan compartment inlet and discharged through an air outlet of the fan compartment.

In still another embodiment, the invention provides an electric motor. The motor has a stator including a plurality of stator windings. A potting cup is disposed at a first axial end of the stator. A frame includes a potting portion disposed at a second axial end of the stator. The stator, potting cup, and frame are adhesively coupled together as one by a potting compound.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

With reference to FIGS. 1-6, in one embodiment of the invention, an electric motor assembly 10 has been designed to provide a path for a fluid, such as air, that brings the fluid into effective heat-exchange contact with the hottest components of the motor, and substantially limits re-circulation of the fluid. FIGS. 1-6 illustrate various aspects of this embodiment of the invention.

Figure 1:
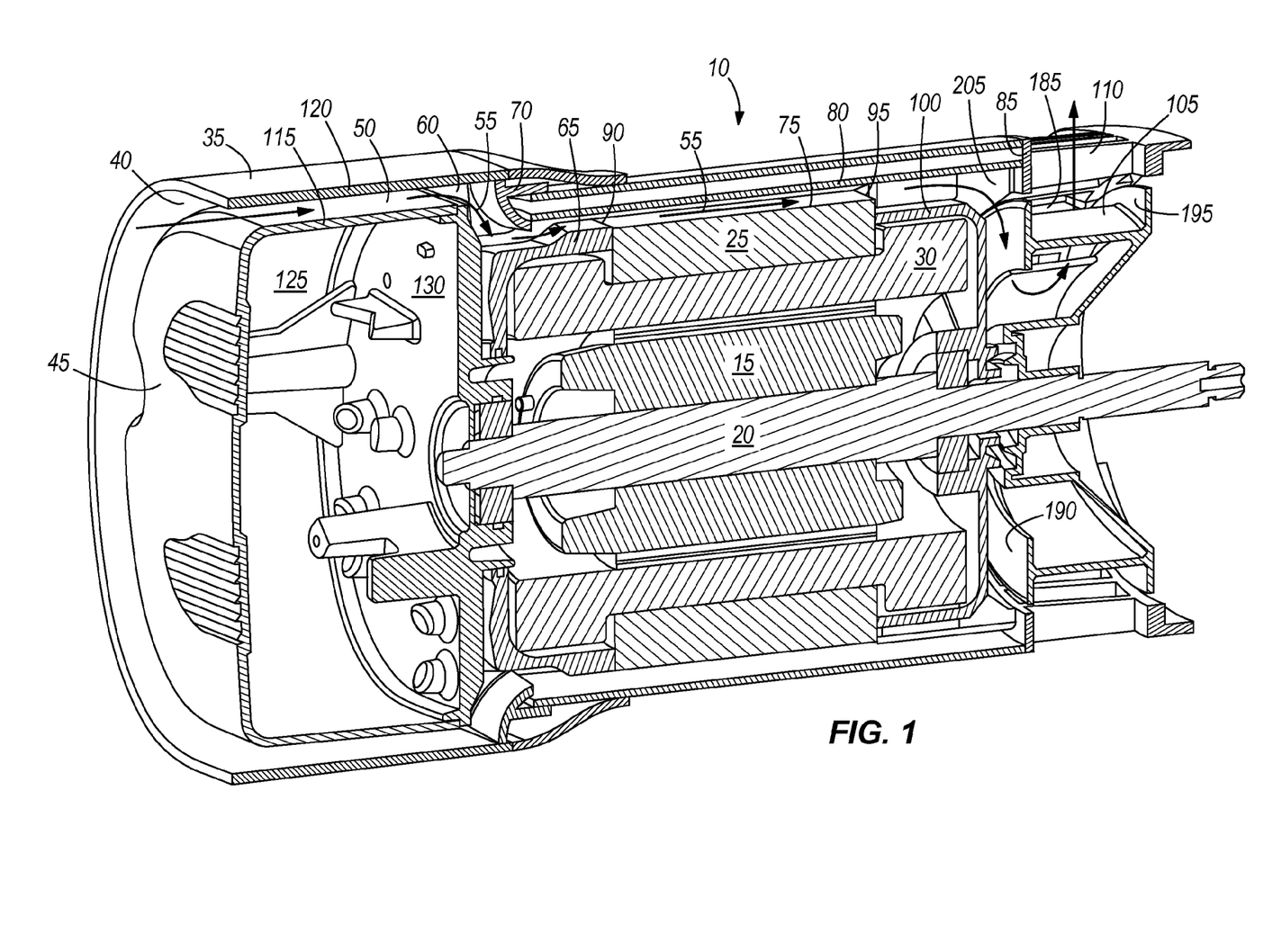
FIG. 1 is a perspective view of an airflow path through a motor according to one embodiment of the invention.

FIG. 1 illustrates a complete airflow path through the motor assembly 10. The motor assembly 10 includes a rotor 15 including a rotating shaft 20, and a stator 25 including a number of windings 30. The rotor 15 is operable to rotate with respect to the stator 25 as a result of applying a current through the windings 30. For ease of description, it is assumed that the stator is manufactured with a number of stacked laminations. However, it is to be understood that other manufacturing processes to form the stator 25 fall within the scope of the invention.

Air enters a canopy 35 through an air inlet 40 at a first end 45 of the motor assembly 10. The canopy 35 provides an enclosure for electrical components of the motor, and also provides a conduit 50 for an airflow 55 from the first end 45 of the motor assembly 10. The airflow 55 reaches a discharge end 60 of the canopy 35 and is redirected radially inwards via a flange 70 towards a lead end stator cup 65. The airflow 55 flows around the lead end stator cup 65 towards the stator 25. Next, the airflow 55 travels along an outer stator wall 75. An air chute 80, disposed between the flange 70 and an opposite lead end frame 85, confines the airflow 55 along the outer stator wall 75 from an inlet end 90 to a discharge end 95. Upon exiting the air chute 80, the airflow 55 travels across a winding portion 100 of the opposite lead end frame 85. Finally, a fan 105 draws the airflow 55 in through the opposite lead end frame 85 and expels the air between structural ribs 110.

Figure 2:
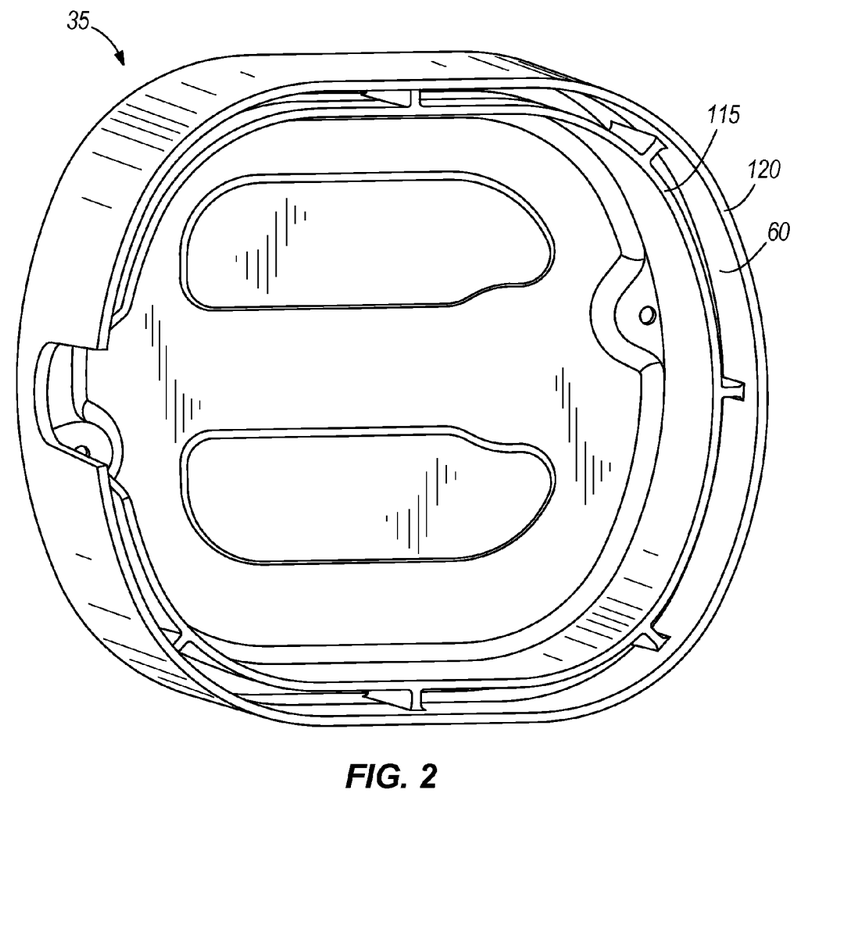
FIG. 2 is a bottom perspective view of a canopy of the motor of FIG. 1.

Within the canopy 35, the conduit 50 is defined between an inner canopy wall 115 and an outer canopy wall 120. FIG. 2 illustrates this double-wall structure of the canopy 35 in greater detail. By utilizing a double-wall structure, the canopy 35 provides both the air inlet 40 from the first end 45 of the motor, and an enclosure for electrical components of the motor. Referring back to FIG. 1, an inner canopy void 125 is encapsulated by the inner canopy wall 115 and a lead end frame 130 of the motor. The inner canopy void 125 encloses electrical components (controller, wire leads, etc.) mounted to the lead end frame 130. The configuration of the canopy 35, including the location and geometry of the air inlet 40, substantially reduces air re-circulation from the fan 105. Having the air inlet 40 around the entire circumference of the canopy reduces the "pull" (or differential pressure) at the inlet and thereby reduces the recirculation of exhausted air back into the motor. Reducing recirculation enables the motor to cool more efficiently.

Figure 3:
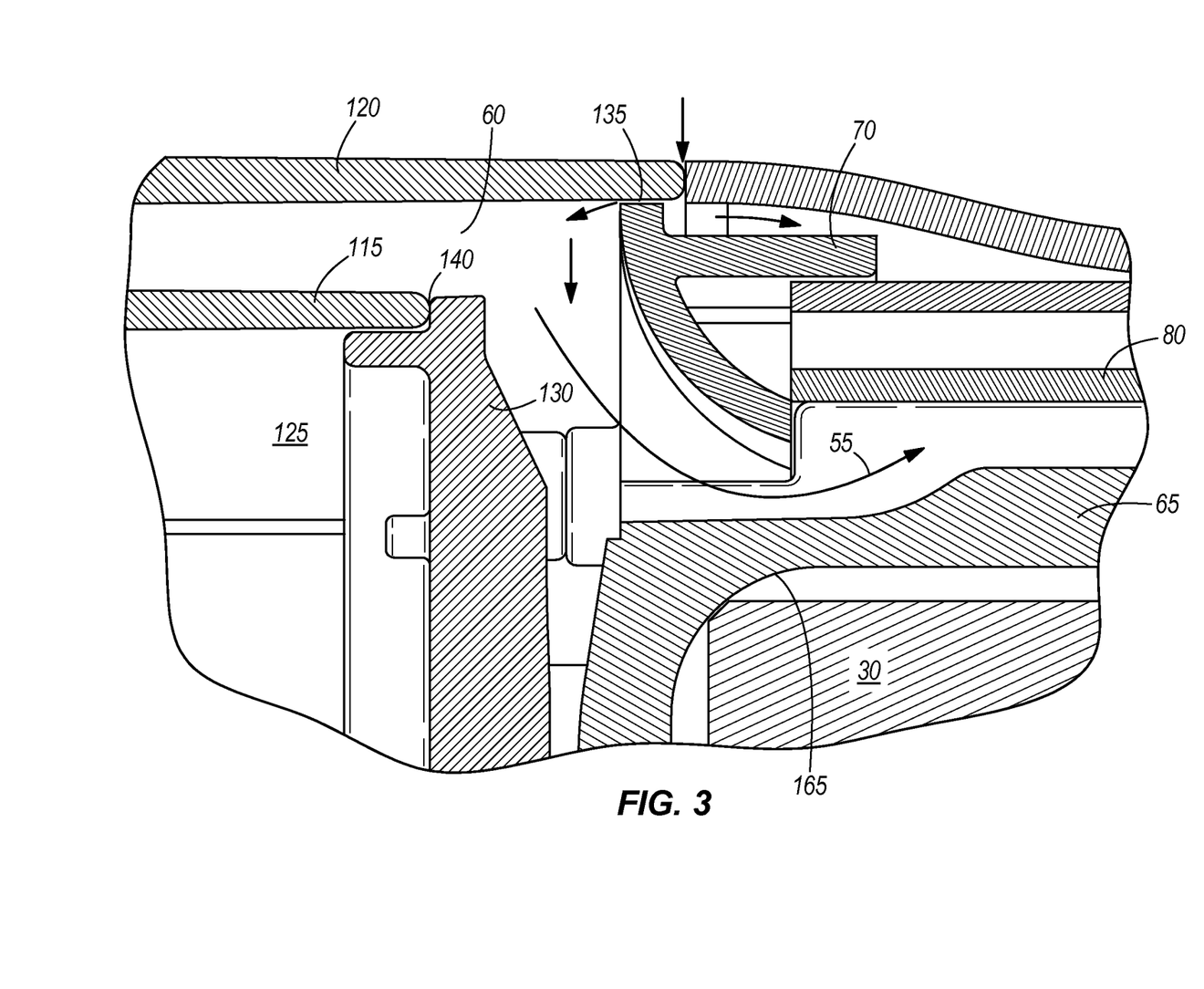
FIG. 3 illustrates a flow path for water entering the canopy of the motor of FIG. 1.

As illustrated in FIG. 3, the outer canopy wall 120 abuts the flange 70 at a junction 135 downstream (with respect to the airflow) of a junction 140 of the inner canopy wall 115 with the lead end frame 130. This construction enables water to enter the motor assembly at the outer canopy wall/flange junction 135 and travel down the airflow 55 path without being able to reach the juncture 140 between the inner canopy wall and the lead end frame. Thus, the electrical components encapsulated between the inner canopy void 125 and the lead end frame 130 are better protected from water or accumulating moisture that may enter the motor externally.

Figure 4:
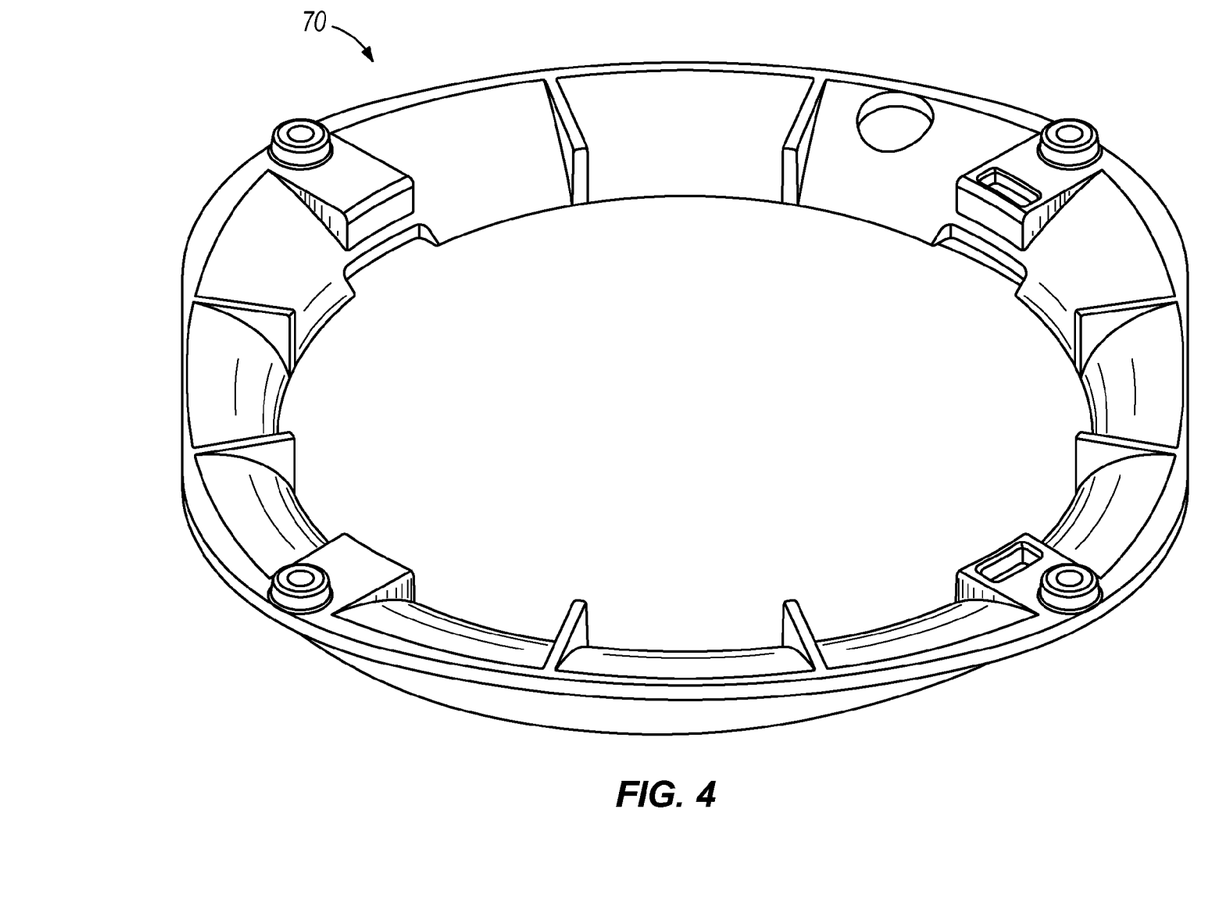
FIG. 4 is a perspective view of a flange of the motor of FIG. 1.

FIG. 3 also illustrates the airflow 55 transitioning from the confines of the canopy 35 to the lead end stator cup 65. The airflow 55 reaches the discharge end 60 of the canopy and is directed radially inward towards the lead end stator cup 65 by the flange 70. The flange 70 is mounted directly to the underside of the lead end frame 130. The flange 70 also mounts tightly to the canopy 35 and redirects the airflow 55 to flow directly against the lead end stator cup 65. As illustrated in FIG. 4, the flange 70 is radiused around its roughly rectangular shape for minimal restriction of the airflow.

Figure 5:
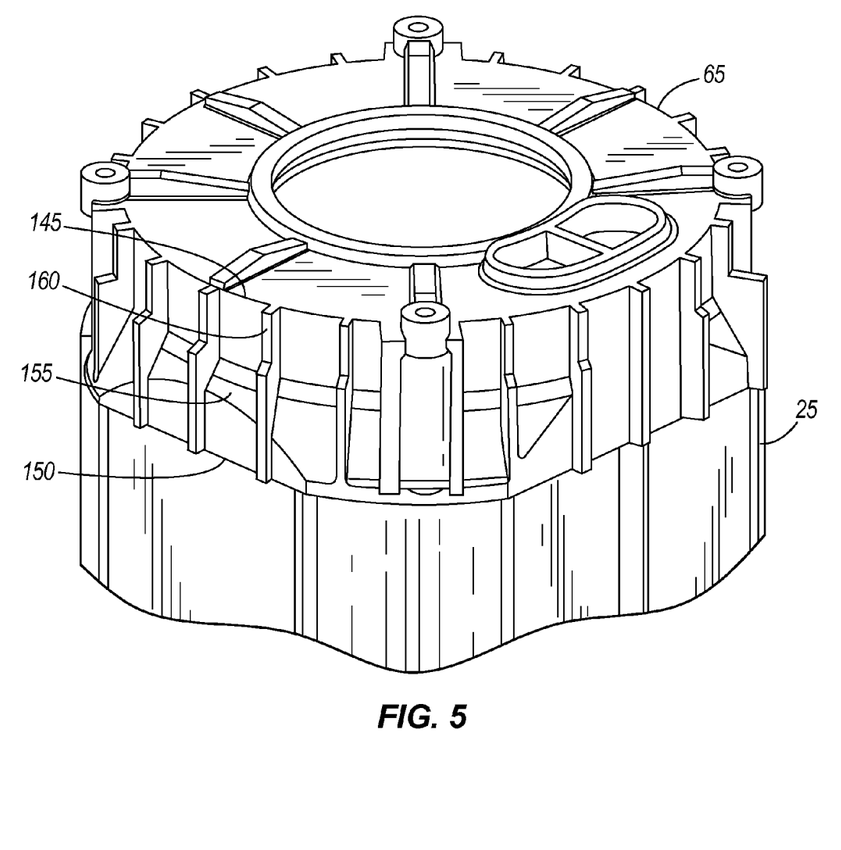
FIG. 5 is a perspective view illustrating the relationship of a lead end stator cup and a stator of the motor of FIG. 1.

FIG. 5 illustrates several aspects of the lead end stator cup 65. The lead end stator cup has an upstream end 145, a downstream end 150, and an outer radial surface 155. The outer radial surface 155 has longitudinal ribs 160 that penetrate the airflow path around the outer radial surface 155 to improve heat transfer from the stator windings 30. The cross-sectional profile of the outer radial surface 155 smoothly transitions from round at the upstream end 145, to the profile of the stator 25 at the downstream end 150 end in order to provide a smooth flow path that minimizes restrictions and to bring the airflow across the outer stator surface 75. Referring back to FIG. 3, an inside radius 165 brings the lead end stator cup 65 casting close to the windings 30 for improved heat transfer. The lead end stator cup 65 may also encapsulate, surround, or support a potting compound surrounding the stator windings 30 in some embodiments, and may therefore be referred to as a "potting cup."

Referring to FIG. 1, air flows from the stator inlet end 90 to the discharge end 95, with the airflow 55 captured between the outer stator surface 75 and the air chute 80. The air chute 80 is positively captured, without the use of fasteners, by the flange 70 at the inlet end 90 and by the opposite lead end frame 85 at the discharge end 95. The airflow 55 is directed across the winding portion 100 of the opposite lead end frame 85. The fan 105 draws air into a fan compartment 185 through a fan inlet 205 of the opposite lead end frame 85 and expels the air between structural ribs 110. The fan compartment 185 is offset from the outer radius of the fan 105, but is tight to a top shelf 190 and bottom shelf 195 of the fan to lessen noise production and reduce recirculation.

Figure 6:
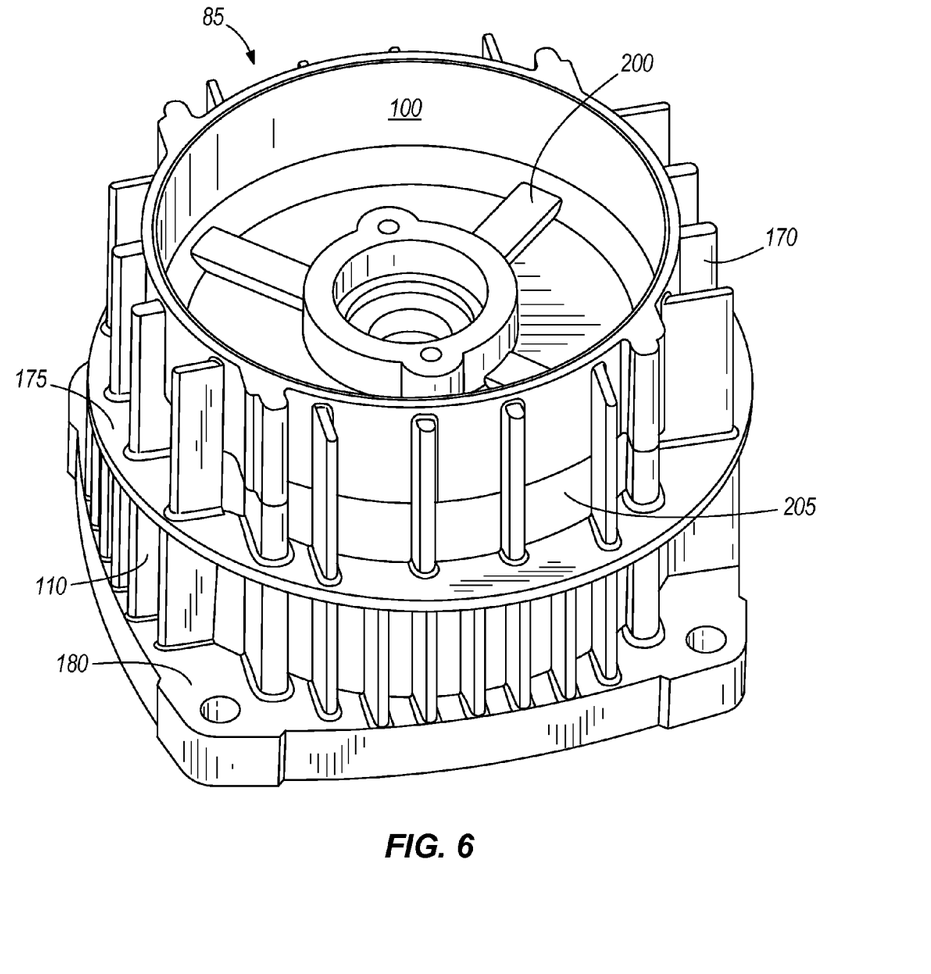
FIG. 6 is a perspective view of the opposite lead end frame of the motor of FIG. 1.

FIG. 6 illustrates several additional features of the opposite lead end frame 85. The winding portion 100 is profiled to bring the casting near the windings 30 for effective heat transfer. The winding portion 100 may encapsulate, surround, or support a potting compound surrounding the windings 30 in some embodiments, and therefore may be referred to as a "potting portion." Like the lead end stator cup 65, the winding portion 100 has longitudinal ribs 170 in the air path to improve heat transfer as the airflow approaches the fan inlet 205. A shelf 175 matches the outer profile of the air chute 80 and provides separation that prevents air recirculation between the air outlet at the structural ribs 110 and the air inlet 40 (FIG. 1). Neither the air chute 80 nor the shelf 175 overhang the mounting flange 180 where bolts are used to mount or otherwise couple the motor to a pump or other load. A top surface of the winding portion 100 has four reinforcement ribs 200 that prevent oscillation of the wall that separates the winding portion 100 and a fan compartment 185 to stabilize and improve the life of the bearing.

Materials: Most external components, including the canopy and air chute, are made out of a plastic. Making these components out of plastic, in combination with thermal barrier provided by the airflow path, maintains the outer surfaces of the motor assembly cool to the touch.

Figure 7:
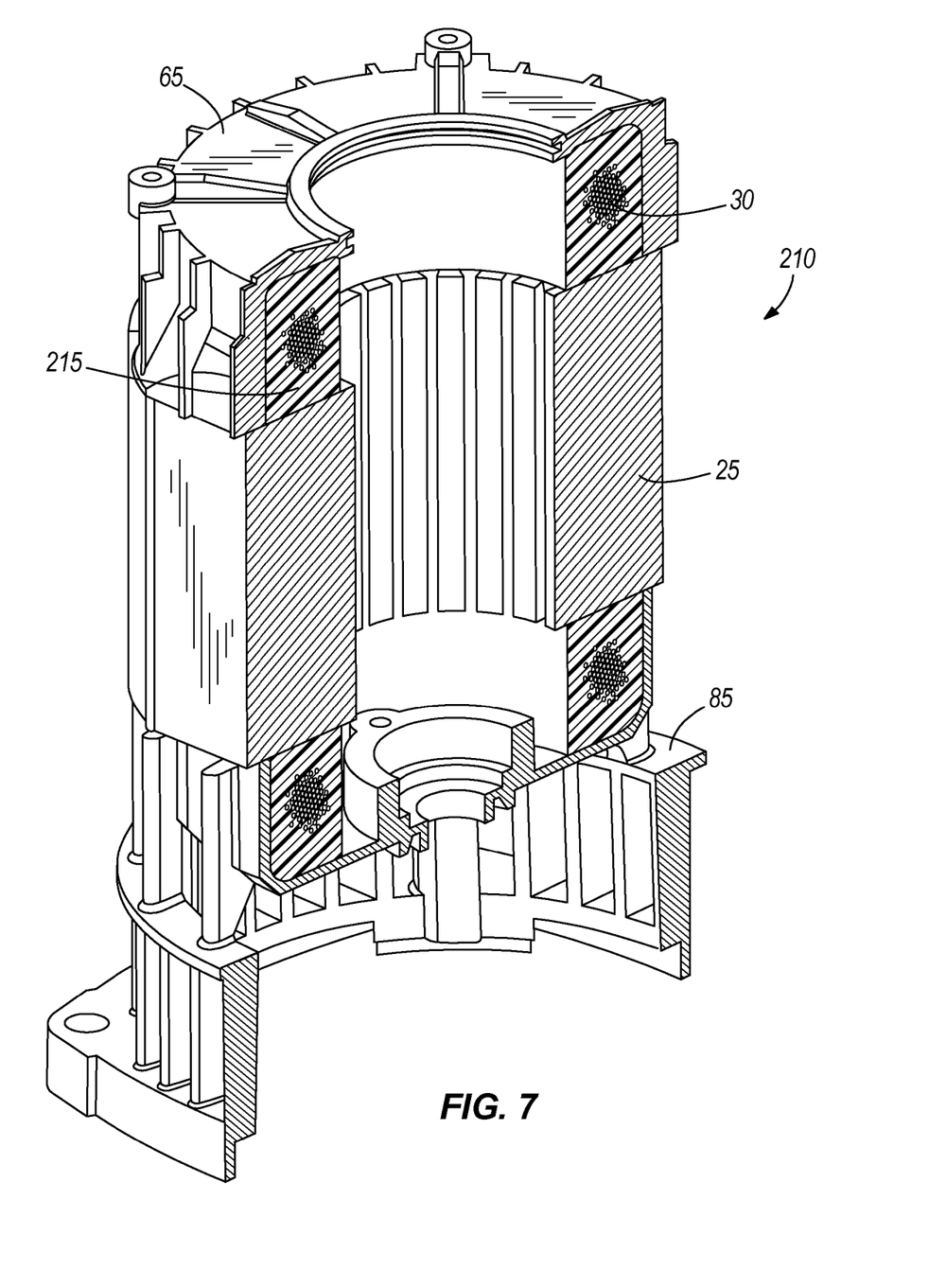
FIG. 7 is a cutaway perspective view of a motor according to another embodiment of the invention.

FIG. 7 illustrates a motor assembly 210 similar to that of FIGS. 1-8, but without a canopy, flange, or air chute. Similar features of the two constructions have been given the same reference numbers. In this construction of the invention, a potting compound 215 surrounding the windings 30 is integral to the motor assembly 210.

Figure 8:
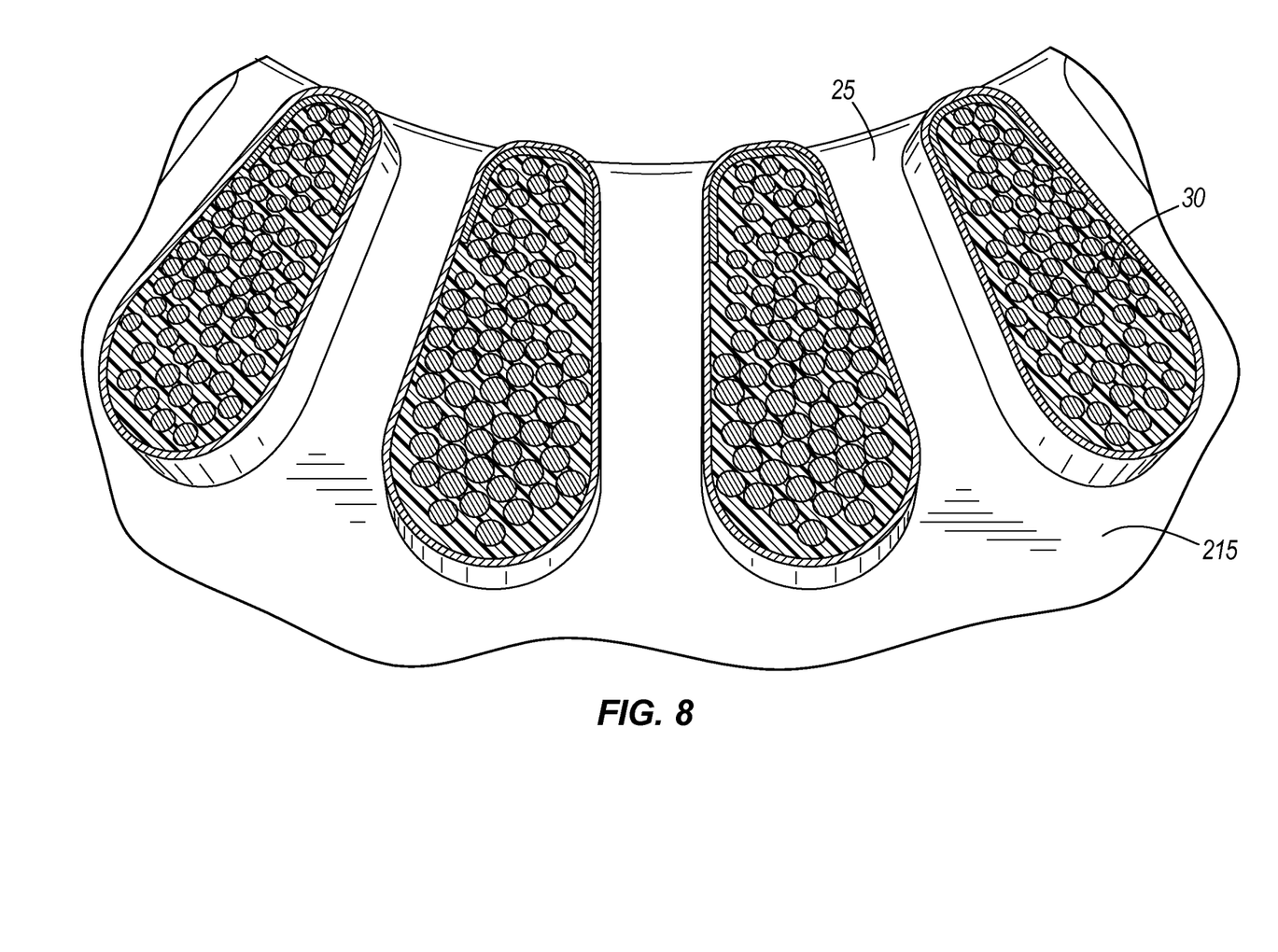
FIG. 8 is a partial perspective view of a potting compound structure formed around windings of the motor of FIG. 7.
Figure 9:
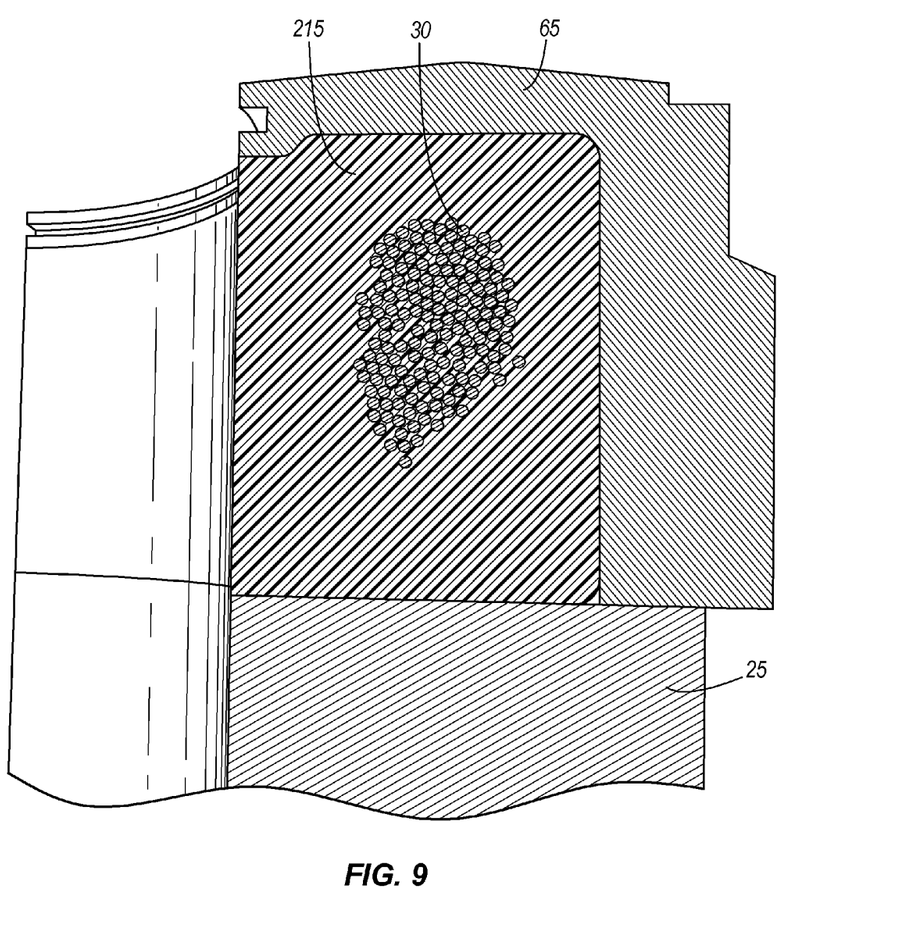
FIG. 9 is a cutaway perspective view of winding end turns encapsulated by the potting compound structure of the motor of FIG. 7.

The potting compound 215 is an insulating resin capable of being poured or injected. Various resins may be used, including epoxies, silicones, urethanes and hybrids. The potting compound solidifies to become a fixed component. FIG. 7 illustrates an assembly consisting of an opposite lead end frame 85, a stator 25, and a lead end stator cup 65 (i.e., a "potting cup"), all of which are permanently held together by the potting compound 215. The potting compound is injected into the assembly as a liquid. After injection, the potting compound solidifies to become a fixed component of the assembly. With reference to FIG. 8, the potting compound 215 fills any voids or channels that would normally run through walls of the stator 25. Furthermore, and with reference to FIG. 9, the potting compound fills end turns of the stator windings 30 up to the edge of the lead end stator cup 65.

The potting compound serves to protect the motor components from shock and vibration and provides electrical insulation and weatherproofing benefits to the components. In addition, by filling the air gaps between the stator and surrounding components, the potting compound increases the rate of heat transfer from the stator to the lead end stator cup and opposite lead end frame.

Thus, the invention provides, among other things, a new and useful air-cooled electric motor. Various features and advantages of the invention are set forth in the following claims.

We claim:

1. An electric machine comprising:
a stator having a first end and a second end;
an end frame including a first cup portion arranged to at least partially contain a portion of the stator, the end frame positioned adjacent the first end of the stator;
a potting cup including a second cup portion arranged to at least partially contain a portion of the stator, the potting cup positioned adjacent the second end of the stator; and
a potting member coupled to the stator, the end frame, and the potting cup to permanently bond the end frame, the potting cup, and the stator to one another.

2. The electric machine of claim 1, wherein the stator includes a core portion having a plurality of axially extending slots, windings disposed at least partially within the slots and extending beyond a first end of the core portion to define a first end winding portion and beyond the second end of the core portion to define a second end winding portion, the stator defining a stator volume.

3. The electric machine of claim 2, wherein the stator and the potting member cooperate to completely fill the stator volume.

4. The electric machine of claim 2, wherein the first end winding portion includes the plurality of windings that define spaces therebetween, and wherein the potting member fills the spaces between the windings to bond the windings to one another.

5. The electric machine of claim 2, wherein the first end winding portion defines a first outer diameter surface and a first axial end surface and wherein the first cup portion abuts the first outer diameter surface and the first axial end surface.

6. The electric machine of claim 5, wherein the second end winding portion defines a second outer diameter surface and a second axial end surface and wherein the second cup portion abuts the second outer diameter surface and the second axial end surface.

7. The electric machine of claim 1, wherein the potting member solidifies within a portion of the stator to permanently bond the stator to each of the end frame and the potting cup.

8. The electric machine of claim 1, wherein the potting compound includes an insulating resin.

9. The electric machine of claim 1, further comprising a second end frame directly connected to the potting cup, the end frame defining a first bearing pocket and the second end frame defining a second bearing pocket.

10. An electric machine comprising:
a stator including a core portion, a first end winding portion, and a second end winding portion, the stator defining an outer perimeter that defines a stator volume;
an end frame including a first cup portion positioned adjacent the first end winding portion and arranged to at least partially surround the first end winding portion;
a potting cup including a second cup portion positioned adjacent the second end winding portion and arranged to at least partially surround the second end winding portion; and
a potting member coupled to the stator, the end frame, and the potting cup to permanently bond the end frame, the potting cup, and the stator to one another, the potting member cooperating with the stator to completely fill the stator volume.

11. The electric machine of claim 10, wherein the core portion includes a plurality of axially extending slots, and windings disposed at least partially within the slots and extending beyond a first end of the core portion to define the first end winding portion and beyond the second end of the core portion to define the second end winding portion.

12. The electric machine of claim 11, wherein the first end winding portion includes the plurality of windings that define spaces therebetween, and wherein the potting member fills the spaces between the windings to bond the windings to one another.

13. The electric machine of claim 10, wherein the first end winding portion defines a first outer diameter surface and a first axial end surface and wherein the first cup portion abuts the first outer diameter surface and the first axial end surface.

14. The electric machine of claim 13, wherein the second end winding portion defines a second outer diameter surface and a second axial end surface and wherein the second cup portion abuts the second outer diameter surface and the second axial end surface.

15. The electric machine of claim 10, wherein the stator and the potting member cooperate to completely fill the stator volume.

16. The electric machine of claim 10, wherein the potting member solidifies within a portion of the stator to permanently bond the stator to each of the end frame and the potting cup.

17. The electric machine of claim 10, wherein, the potting compound includes an insulating resin.

18. The electric machine of claim 10, further comprising a second end frame directly connected to the potting cup, the end frame defining a first bearing pocket and the second end frame defining a second bearing pocket.

* * * * *